Oct. 28, 1952      J. W. O'BRIEN      2,616,021
ELECTRIC FOOD WARMER
Filed Oct. 4, 1950
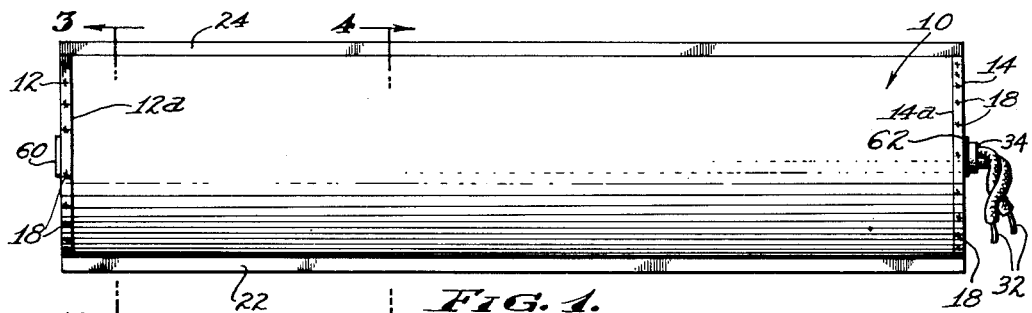//
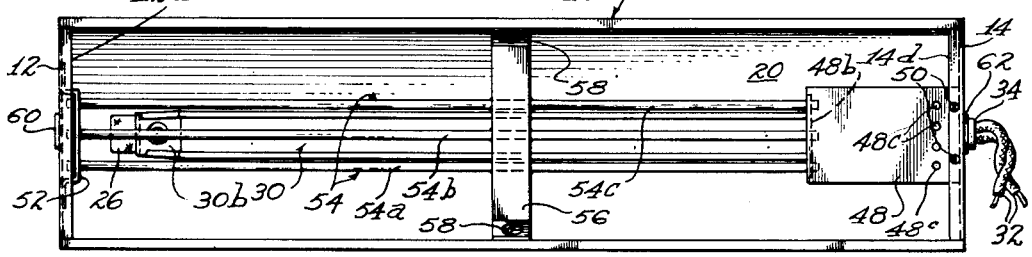
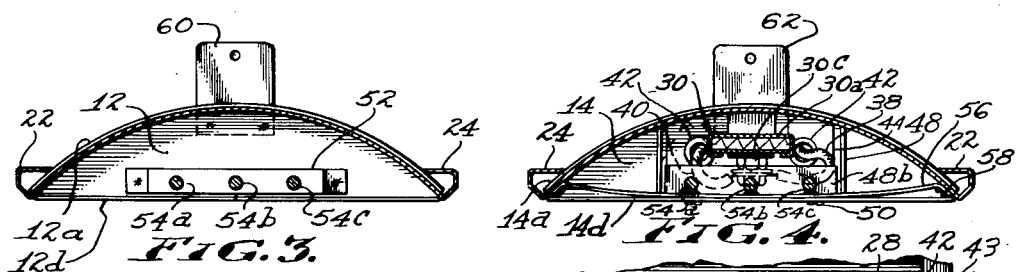
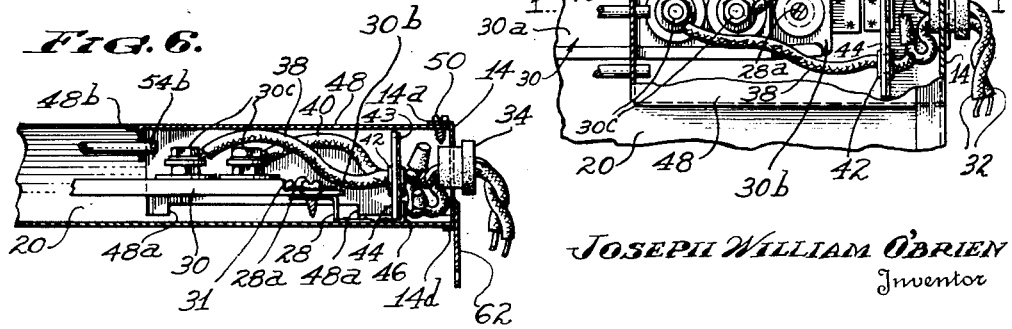
JOSEPH WILLIAM O'BRIEN
Inventor
Attorney Patented Oct. 28, 1952

2,616,021

UNITED STATES PATENT OFFICE 2,616,021

ELECTRIC FOOD WARMER

Joseph William O'Brien, Los Angeles, Calif.

Application October 4, 1950, Serial No. 188,352

2 Claims. (Cl. 219—34)

My invention relates to an electric heating device particularly designed for maintaining a definite area at a predetermined temperature and specifically intended for use in maintaining cooked dishes, which should be eaten while hot, at a desirable temperature until served, although the invention is not limited to such use.

My invention is therefore particularly adapted for use in restaurants and other eating places in which at present, in order to serve hot dishes, the waiters have to bring each order from the kitchen as soon as it is cooked, which involves considerable additional expense in using a large number of waiters and cooks, or involves the expense of fitting steam tables for keeping dishes hot until required for service in order to avoid the maintenance of a large staff.

It is an object of my invention to provide an inexpensive device requiring a minimum of care in maintenance which will enable hot cooked food to be kept at a desired temperature until served.

A further object of my invention is to provide a device for heating food, which is readily adjusted to heat shelves or tables of different widths.

Another object of my invention is to provide a heating device of the kind described which may be readily taken apart and all parts easily cleaned and reassembled.

Still further objects and advantages reside in the novel combination of parts whereby without dismantling the entire structure, the wiring connections can be inspected and repaired with less damage to the reflecting surface of the device and wherein the raising and lowering of the device makes more feasible the heating and keeping warm of different kinds of prepared foods deposited thereunder and awaiting serving.

Other objects, advantages and features of invention will hereinafter appear.

Referring to the drawing wherein is shown a manufactured embodiment of the invention as now being sold in the trade, Fig. 1 is a top plan view of the heating device of my invention;

Fig. 2 is a bottom plan view;

Fig. 3 is a cross section on line 3—3 of Fig. 1;

Fig. 4 is a cross section on line 4—4 of Fig. 1;

Fig. 5 is an enlarged, fragmentary bottom plan view of the parts shown in Fig. 4, portions being broken away to disclose underlying structure; and Fig. 6 is a cross section on line 6—6 of Fig. 5.

In Fig. 1 the numeral 10 indicates the reflector element of the heater which, in the embodiment illustrated, is formed as a segment of a circle, as indicated in Fig. 4, transversely of its length. The device may be made of any length desired, the embodiment illustrated being about three and a half feet.

The reflector and all other metal parts of the heater are made of stainless steel so that they are not subject to corrosion in use.

The ends of the reflective member 10 are closed by end walls 12, 14, the edges of the end walls being flanged inwardly as indicated at 12a and 14a secured as by spot welding to the reflective member as indicated at 18.

The concave face of the reflective member is polished to provide a surface 20 effective to reflect heat rays incident thereon.

The longitudinal edges of the reflective member are stiffened by being rolled outwardly to form beads 22, 24.

A mounting bracket 26 for a heating element is welded to the concave surface of the reflective member toward one end and a similar bracket 28 Fig. 6 is welded toward the opposite end of reflective member.

A strip heating element 30 of a commercially available type of bar like form is mounted longitudinally in the heat reflective member 10. The element 30 is provided with a metallic sheath 30a having projecting lugs 30b with mounting holes therein of relatively large size. The element is mounted on the brackets 26, 28 spacing it from the reflective surface 20 by means of screws engaging the brackets and passing through discs of mica or asbestos 31 of larger diameter than the holes and bowed down into the holes by the heads of the screws.

Electric leads 32 are connected to the heating element 30 at one end in any suitable manner, for instance as shown in Fig. 5 through a bushing 34 positioned in a hole in end wall 14 and spliced, inwardly of the wall, inside connectors 36 of insulating material, to asbestos covered leads 38, 40. Leads 38, 40 pass through eyelets 42, which serve to hold a sheet of asbestos 43 on a plate 44 secured to a bracket 46 welded to the reflector member between the end of the heating element 30 and end wall 14. The asbestos sheet 43 will therefore deflect heat from the heating element from the connectors 36 and leads 32.

It will be noted that plate 44 serves to protect the leads from the heat emitted from the heating element.

The connections to the heating element 30 are covered by a small sheet metal casing 48 (Fig. 6) secured at one end to the inturned flange 14d of end wall 14 by screws 50, and having inwardly projecting lugs 48a at its ends engaging with the reflective member and spacing its inward edge from the reflective surface 20. Holes 48c are provided in the top of the casing to facilitate circulation of air therethrough.

The inward edge of the case 48 is provided with an inwardly projecting flange 48b in which a number of holes are drilled and an equal number of holes are drilled in an inwardly projecting bracket 52 secured to the opposite end wall 12, facing and alined with the holes in flange 48b.

A guard 54 for heating element 30 is provided by a number of spaced bendable rods 54a, 54b, 54c, secured to a retaining member 56 which may be formed as a flat metal strip to which the rods of the guard 54 are connected as by welding. The ends of the rods of the guard 54 are mounted in the alined holes in bracket 52 and flange 48b as shown in Fig. 2. Strip 56 is secured to the heater by screws 58.

Lugs 60, 62 are secured, as by spot welding to end walls 12 and 14, and are drilled with holes enabling the device to be suspended over the food to be maintained in warm or hot condition at a height dependent on the width of the area to be heated.

It will be noted that all parts of the heater may be very quickly taken apart for cleaning or any other reason.

By unscrewing screws 58 the guard may be slipped free of the heater. Unscrewing screws 50 enables case 48 to be slipped away from end wall 14 to expose leads, or to be removed, and loosening the screw terminals 30c, 30c and screws 28a, one of which is shown in Fig. 5 and Fig. 6, enables the heater element 30 to be removed.

In slipping the case 48 away from end wall 14 as aforesaid such operation may be completed without marring the reflective surface of the device by the lugs 48a, by slightly flexing the rods 54a, 54b and 54c as a unit as the case is longitudinally extended therealong.

The heat emitted by the heater element 30 is partly radiated directly onto the food to be kept hot or warm and part of the heat is reflected by the reflective surface as indicated in Fig. 4, and by adjusting the height of the heater above the food, the width of the surface heated by the heat rays may be readily adjusted so that the heater may be readily positioned to heat tables or shelves of different width.

An important advantage of positioning the heater of my invention spaced from the food to be heated is that greasy vapors rising from the food are dissipated before reaching the reflective surface of the heater. If the reflective surface does in time become dulled by a film of grease, the surface may be readily cleaned by a cloth simply by wiping the area effected.

The provision of a metal encased heating element avoids any danger from breakage of the glass envelope of the filament type of electric heating element and from particles flaked off from a coiled open resistance element while the provision of the guard rods prevents damage from burns to personnel without diminishing the heat radiated by the device from all portions of the resistance heated bar like element 30.

While I have described and illustrated a presently preferred embodiment of my invention which has given satisfactory service in actual use, it is to be understood that various changes and modifications may be made therein by those skilled in the art without departing from the scope of the invention as intended to be defined by the appended claims.

What I claim is:

1. An electrical device for radiating heat downwardly upon a determined area, comprising: a single upper member providing a concave heat reflective surface and a convex top; means secured to said member whereby said member is supported, concave side downward, at a determined distance above said area; a resistance heated metal bar like element arranged to extend longitudinally within said concave reflective member; means spacing said heating element from the reflective member; end walls secured to said reflective member; lead in wires secured to one end of said heating element and passing through an opening in an end wall; a heat deflecting partition secured to the concave member below the end of the heating element and said end wall; a case detachably secured to said end wall and extending over said heat deflecting partition and the leads secured to said heating element and provided with projections engaging against the reflective member but spacing the bottom wall of the case from said member, apertures being provided in the wall of the case to facilitate circulation of air therethrough; a bracket mounted on the end wall opposite to that to which the case is detachably secured; and a plurality of bendable rods mounted in alined holes in said bracket and case and constituting a guard for said heating element, said case being slidable on the ends of the rods projecting thereinto.

2. An electrical device for radiating heat downwardly upon a determined area, comprising: a single upper member providing a concave heating reflective surface and a convex top; means secured to said member whereby said member is supported, concave side downward, at a determined distance above said area; a resistance heated metal bar like element arranged to extend longitudinally within said concave reflective member; means spacing said heating element from the reflective member; end walls secured to said reflective member; lead in wires secured to one end of said heating element and passing through an opening in an end wall; a heat deflecting partition secured to the concave member below the end of the heating element and said end wall; a case detachably secured to said end wall and extending over said heat deflecting partition and the leads secured to said heating element and provided with projections engaging against the reflective member but spacing the bottom wall of the case from said member, apertures being provided in the wall of the case to facilitate circulation of air therethrough; a bracket mounted on the end wall opposite to that to which the case is detachably secured; a plurality of rods mounted in alined holes in said bracket and case constituting a guard for said heating element; and a transversely arranged member secured to the rods intermediate their length and detachably secured to the concave heat reflecting member, and effective to position the rods with respect thereto, said rods being bendable so that after the case is detached from the end wall it may be slipped along said rods and out of contact with the polished surface thereof by springing outwardly the ends of said rods while engaged in the holes in the case.

JOSEPH WILLIAM O'BRIEN.

(References on following page)

REFERENCES CITED

The following references are of record in the file of this patent:

UNITED STATES PATENTS

| Number | Name | Date |
|---|---|---|
| 1,389,397 | Tactikos | Aug. 30, 1921 |
| 1,686,865 | Koltz | Oct. 9, 1928 |
| 1,721,099 | Wiegand | July 16, 1929 |
| 2,369,803 | Sardeson | Feb. 20, 1945 |
| 2,590,417 | Jones | Mar. 25, 1952 |

FOREIGN PATENTS

| Number | Country | Date |
|---|---|---|
| 382,369 | Great Britain | Oct. 27, 1932 |
| 522,821 | Great Britain | June 27, 1940 |
| 619,271 | Great Britain | Mar. 7, 1949 |
| 616,597 | Great Britain | Jan. 24, 1949 |